United States Patent Office 3,129,341
Patented Apr. 14, 1964

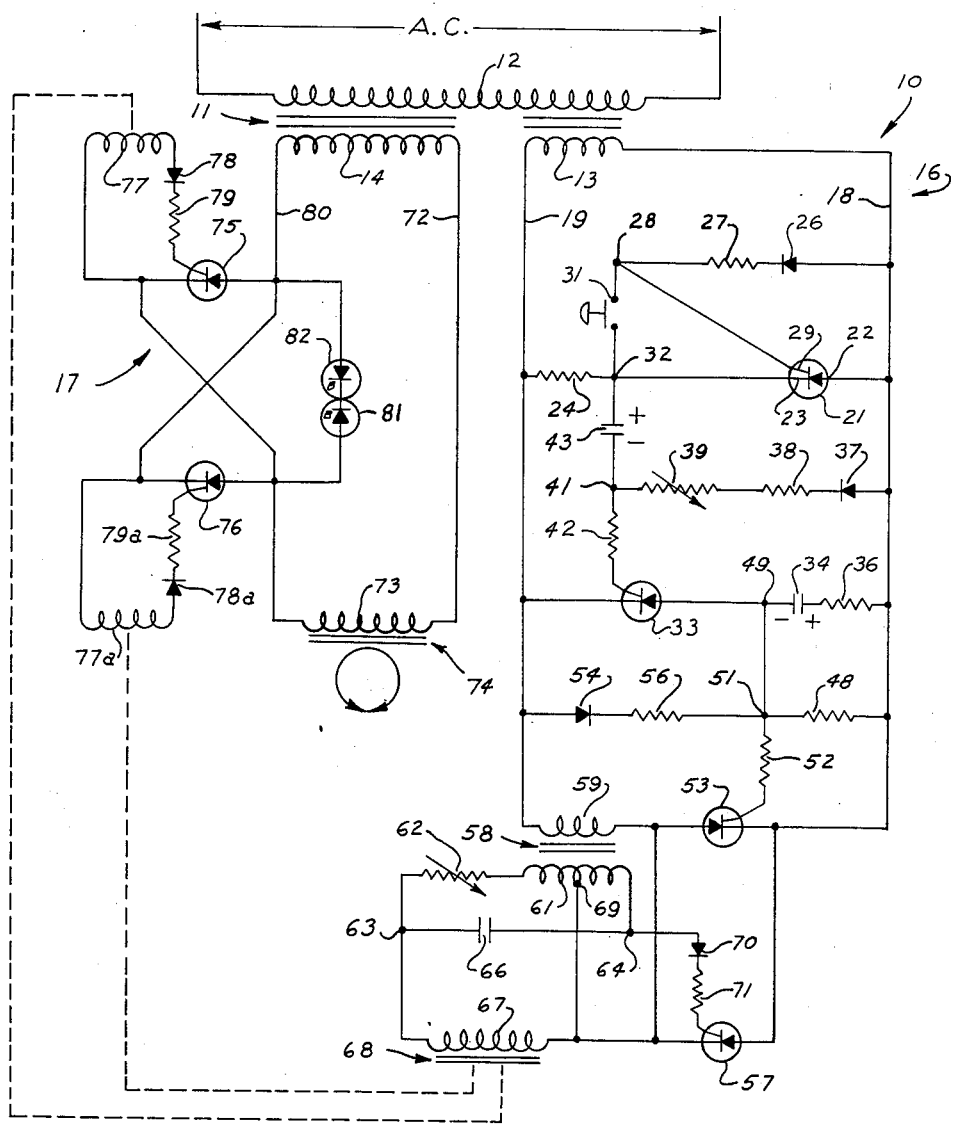

3,129,341
SYNCHRONOUS WELD TIMER USING SEMI-
CONDUCTOR CONTROLLED RECTIFIERS
Stuart C. Rockafellow, Plymouth, Mich., assignor to
Robotron Corporation, Detroit, Mich., a corporation of
Michigan
Filed Sept. 6, 1960, Ser. No. 53,975
6 Claims. (Cl. 307—88.5)

This invention relates to improved electrical circuitry employing semiconductor, controlled rectifiers, sometimes referred to as gated rectifiers, and more particularly, to circuitry for precisely controlling the supply of energy to a load, particularly a welding transformer.

In my prior U.S. Patent No. 2,516,422, there is disclosed an electrical circuit for controlling the flow of energy to a load. This circuit employs a capacitor which is alternately charged and discharged. The time required to discharge the capacitor to a predetermined level is utilized to determine the time period a load is energized. The capacitor always commences to discharge at a particular point in the wave-form of the alternating potential source regardless of the time at which the initiating switch is closed. While this circuit has been found to be effective and reliable in operation continuing efforts have been made to improve upon this circuit and the present invention is an outgrowth of these efforts.

It has been found that the use of semiconductor, controlled rectifiers, sometimes referred to as gated rectifiers, in place of the thyratons utilized in my prior circuit markedly improves certain of the qualities of the prior circuit. Particularly, the use of so called gated rectifiers provides a number of advantages among which are the following:

(a) They develop no heat in operation and hence neither waste power nor require cooling;
(b) They do not wear or burn out and hence require no replacement;
(c) They are virtually indestructible and hence can absorb both shock and vibration without damage;
(d) They are much smaller than tubes of corresponding rating, and
(e) They are more adaptable than tubes to use in printed circuits.

Therefore, it is highly desirable to provide a circuit incorporating the advantages of the circuit shown in the above-mentioned patent with the advantages of the gated rectifiers.

However, semiconductor, controlled rectifiers have certain critical control features which must be taken into account in devising circuits intended for purposes the same or similar to the purposes of my prior circuit described above. In particular, a semiconductor, controlled rectifier cannot become conductive until the gate thereof is positive with respect to the cathode thereof, so long as the voltage applied thereto is within the voltage rating of the rectifier. Further, the voltage rating of a semiconductor, controlled rectifier cannot be exceeded or the rectifier will be irreparably damaged. Moreover, the gate-to-cathode path in a semiconductor, controlled rectifier can itself be used as a rectifier, for example, to effect charging of a timing capacitor in a circuit of the type described above from an alternating potential source. The present invention makes provision for these characteristics and provides circuit modifications and improvements which make it possible to use semiconductor, controlled rectifiers in circuits of the type disclosed in my prior patent and others of generally similar character with the several resultant advantages above-named.

Accordingly, it is an object of this invention to provide an improved circuit utilizing semiconductor, controlled rectifiers for controlling the supply of energy to a load, such as a welding transformer.

It is a further object of this invention to provide an improved circuit, as aforesaid, in which the gate-to-cathode conduction of a semiconductor, controlled rectifier is utilized to place a charge on a capacitor, such as a capacitor utilized for timing purposes.

It is a further object of this invention to provide an improved circuit, as aforesaid, in which the charge on a capacitor is effective to block conduction of a semiconductor, controlled rectifier whose gate-to-cathode conduction was previously utilized to place the charge on such capacitor.

It is a further object of this invention to provide an improved circuit, as aforesaid, in which biasing means are connected to the gates of the semiconductor, controlled rectifiers to normally bias same positive so that the rectifiers will be capable of conduction and other means are provided to overcome the bias and block conduction of the rectifiers at selected intervals.

It is a further object of this invention to provide an improved circuit, as aforesaid, for supplying full wave potential to further circuitry by means of two back-to-back connected semiconductor, controlled rectifiers and utilizing the energy supplied to such further circuitry by one of such rectifiers to control conduction of the other.

It is a further object of this invention to provide an improved circuit utilizing semiconductor, controlled rectifiers for supplying energy to a welding transformer in which protective devices are provided to insure that the voltage ratings of the semiconductor, controlled rectifiers utilized to control supply of such energy are not exceeded.

It is a further object of this invention to provide an improved circuit, as aforesaid, which is comprised of relatively simple and reliable components and which is, therefore, easy and effective and reliable in operation.

Other objects and advantages of the invention will become apparent to persons acquainted with circuits of this type upon reading the following description and inspecting the accompanying drawing which is a circuit diagram of the circuit to which the invention relates.

*General Description*

The invention provides electrical circuitry including a plurality of semiconductor, controlled rectifiers. A timing capacitor is connected to the gate of one of said rectifiers and it is charged by gate-to-cathode conduction therein. At an appropriate time, as described in greater detail hereinbelow, the charge on this capacitor becomes effective to overcome the positive bias normally present on the gate of said one rectifier to thereby render same non-conductive. The capacitor is adapted to discharge at a precisely controllable rate so that the rectifier again becomes conductive at a predetermined time following the time at which it was rendered non conductive by the capacitor. The circuit is arranged so that the capacitor can block conduction of the rectifier starting only at the beginning of positive half-cycles of the alternating potential source whereby the timing operation always commences at the same point in the wave-form of the alternating potential source.

A pair of back-to-back connected semiconductor, controlled rectifiers are provided and are connected to the alternating potential source in such fashion that they control the supply of full wave A.C. potential to further circuitry. The gate of one of the last-named rectifiers is connected to the previously described circuitry so that the discharging of the capacitor and the subsequent conduction of the rectifier controlled thereby will control the conduction of the last-mentioned rectifier. The further circuitry is connected to the gate of the other of said pair of rectifiers so that it makes same positive in response to conduction of the first of said last-mentioned pair of rectifiers. Thus, the second of said last-mentioned pair of rectifiers will continue to conduct on alternate half-cycles so long as the first of said last-mentioned pair of rectifiers is conductive on the preceding half-cycle.

The further circuitry above referred to preferably includes a transformer whose secondary winding is connected to a phase shift circuit and to the primary winding of a further transformer. The secondary windings of the further transformer are connected to supply positive potential to a third pair of semiconductor, controlled rectifiers which are connected in back-to-back relationship for controlling the supply of energy to a welding transformer. Voltage reference diodes or Zeners are connected in parallel with the third pair of rectifiers and these serve to prevent an excessive voltage from being applied on said rectifiers and in all cases limit the voltage applied thereon to something below the rated value thereof.

*Detailed description*

Referring to the drawing, there is shown an electrical circuit 10 illustrating an embodiment of the invention and including a transformer 11 whose primary winding 12 is connected to a suitable A.C. source. The transformer 11 has two secondary windings 13 and 14 which are connected, respectively, to supply power to the weld timing circuit 16 and to the contactor circuit 17.

The weld timing circuit 16 includes a first conductor 18 which is connected to one end of the secondary winding 13 and a second conductor 19 which is connected to the other end thereof. The turns ratio of the secondary winding 13 with respect to primary winding 12 is selected so that an A.C. potential of suitable value is applied to conductors 18 and 19. This value must be such that the voltage rating of the semiconductor, controlled rectifiers mentioned hereinafter is not exceeded. It has been found satisfactory to apply a potential of 24 volts on conductors 18 and 19 for rectifiers having a rating of 50 volts.

A first, semiconductor, controlled rectifier 21 has its anode 22 connected to the conductor 18 and its cathode 23 is connected through a resistance 24 to the conductor 19. A biasing means, which is here shown as being a rectifier 26, is connected through a resistance 27 and a junction point 28 to the gate 29 of the rectifier 21. The rectifier 26 is connected to the conductor 18. Thus, when conductor 18 is positive, positive potential is applied on the gate 29 and this potential, if not otherwise overcome, will be sufficient to cause the rectifier 21 to become conductive.

A switch 31 is connected between a junction point 32, which is located between the cathode 23 and the resistor 24, and the junction point 28. When the switch 31 is closed, the cathode 23 and the gate 29 will be at the same potential and the rectifier 21 will, therefore, be nonconductive. The switch 31 may be of any suitable mechanical or electrical type and may be suitable further electrical circuitry.

A second, semiconductor, controlled rectifier 33 has its anode connected through a capacitor 34 and a resistance 36 to the conductor 18 and its cathode is connected to the conductor 19. A suitable biasing means, such as a rectifier 37, is connected through a fixed resistance 38 and an adjustable resistance 39 to a junction point 41, thence through a resistance 42 to the gate of the rectifier 33. When the conductor 18 is positive, positive potential will be applied by rectifier 37 to the gate of rectifier 33.

A timing capacitor 43 is connected between the junction points 32 and 41. As will be described in greater detail hereinbelow, this capacitor is charged by gate-to-cathode conduction within the rectifier 33. The capacitor will discharge at a selected time through a discharge path comprising the resistances 39 and 38, rectifier 37, conductor 18, winding 13, conductor 19 and resistance 24. The discharge rate of capacitor 43 is controlled by the setting of adjustable resistance 39.

A resistance 48 is connected in parallel with the capacitor 34 and defines therewith a time constant circuit. The capacitor 34 will be charged when the rectifier 33 is conductive and it will discharge when said rectifier is nonconductive. A junction point 49 between the capacitor 34 and the rectifier 33 is connected through a further junction point 51 and a resistance 52 to the control gate of a third semiconductor, controlled rectifier 53. The rectifier 53 is connected in opposite polarity to the conductors 18 and 19 as compared with the connection of rectifiers 21 and 33. A biasing means, such as a rectifier 54, is connected through a resistance 56, the junction point 51 and resistance 52 to the gate of rectifier 33 and serves to place a positive bias on same when the conductor 19 is positive.

A fourth, semiconductor, controlled rectifier 57 is connected in back-to-back relationship with the rectifier 53. Thus, the rectifiers 53 and 57 are capable of conducting on alternate half-cycles of the alternating potential source.

A transformer 58 has its primary winding 59 connected to the anode of rectifier 53 and to the cathode of rectifier 57. Its secondary winding 61 is connected at one end through an adjustable resistance 62 to a junction point 63. The other end of the secondary winding 61 is connected to a junction point 64, thence through a capacitor 66 to the junction point 63. The adjustable resistance 62 and the capacitor 66 define a resistance-capacitance phase shift circuit in accordance with well understood principles. The junction point 63 is also connected to one end of the primary winding 67 of a transformer 68. The other end of said primary winding 67 is connected to a center tap 69 on the secondary winding 61 and is also connected to the cathode of rectifier 57 and the anode of rectifier 53. The circuit including the rectifiers 53 and 57, transformer 58 and the phase shift circuit will cause flow of energy through the primary winding 67 at selectable times with respect to the waveform of the alternating potential source, depending upon the setting of the adjustable resistance 62. This flow of energy through the transformer 68 is effective, as described in greater detail hereinbelow, to control operation of the contactor circuit 17.

To effect conduction of the rectifier 57 the junction point 64 is also connected through a rectifier 70 and a resistance 71 to the gate of the rectifier 57. Thus, when the rectifier 53 is conductive and energy flows through the transformer 58, a portion of the energy in the secondary winding, which will be of a relatively minor amount, will travel through the rectifier 70 and resistance 71 to make the gate of rectifier 57 positive so that it can conduct.

Turning now to the contactor circuit 17, one end of the secondary winding 14 is connected through a conductor 72 to one end of the primary winding 73 of a welding transformer 74. The other end of the primary winding 73 is connected through a pair of back-to-back connected semiconductor, controlled rectifiers 75 and 76 and thence through conductor 80 to the other end of the secondary winding 14. The voltage applied to conductors 72 and 80 may be of any value suitable for the welding operation, such as 230 volts. The rectifiers 75 and 76 will be selected so that they have a voltage rating in excess of the peak voltage in the conductors 72 and 80.

Circuitry is provided for effecting conduction of the rectifier 75 at suitable times and such circuitry includes a secondary winding 77 of the transformer 68 which winding is connected through a rectifier 78 and a resistance 79 to the gate of said rectifier 75. Thus, when the transformer 68 is energized, half-cycles of positive potential will be applied to the gate of rectifier 75 and it will be capable of conduction.

The rectifier 76 has circuitry corresponding to that just described with respect to the rectifier 75 connected thereto and such circuitry is indicated with the same reference numerals with the suffix "a" applied thereto.

The rectifiers 75 and 76, for the usual type of welding operation, must be capable of carrying substantial quantities of current but the voltage ratings of semiconductor, controlled rectifiers cannot be exceeded without irreparable damage thereto. In order to prevent the voltage ratings of the rectifiers 75 and 76 from being exceeded a pair of voltage reference diodes 81 and 82, commonly called Zeners, are connected in series and in opposing polarities to each other and are connected in parallel with the rectifiers 75 and 76. Zeners have the characteristic that application of a reverse voltage thereon in excess of a certain value usually referred to as the breakdown-reverse voltage or Zener voltage, is met by an increase reverse current flow which tends to counteract any further reverse voltage increase and this maintains a steady voltage drop across the Zener. Thus, if sudden high voltage should be developed, such as transients created by collapsing the flux in the welding transformer, such high voltage will be prevented from acting on the rectifiers 75 and 76 by the Zeners 81 and 82. Obviously, the Zeners 81 and 82 are selected so that the Zener voltage thereof is below the maximum rated voltage of the rectifiers 75 and 76.

*Operation*

At rest, the rectifier 21 is conductive on the positive half-cycles of conductor 18 because a positive potential is applied to its gate 29 by the rectifier 26. With the rectifier 21 conductive, there is a voltage drop across the resistor 24.

As previously described, semiconductor, controlled rectifiers have the characteristic that the gate-to-cathode path thereof acts as a rectifier. Since there is a voltage drop across resistor 24 on the positive half-cycles of conductor 18 and since the gate-to-cathode path in rectifier 33 functions as a rectifier, the capacitor 43 will be charged with its negative side being connected to the junction point 41. However, there is also a voltage difference across this gate-to-cathode path such that the gate of rectifier 33 is slightly positive with respect to the cathode thereof. Thus, the rectifier 33 is conductive on half-cycles when conductor 18 is positive. This serves to charge the capacitor 34 with the negative side thereof being connected to the junction point 49.

The negative potential appearing at point 49 overcomes the positive potential supplied by rectifier 54 on half-cycles when conductor 19 is positive and keeps the rectifier 53 nonconductive and thereby prevents conduction of rectifier 57. Thus, the contactor circuit 17 is deenergized.

Operation of the circuit is initiated by closing the switch 31. As noted above, the switch may be a manually operated switch, as shown, or it may be further electrical circuitry if desired. When the switch 31 is closed the cathode 23 and the gate 29 of rectifier 21 are placed at the same potential and this will serve to make it impossible for the rectifier 21 to again become conductive. However, semiconductor, controlled rectifiers have the characteristic that once conduction thereof occurs at any point during a given half-cycle, such conduction will continue until the end of that half-cycle even though the gate is made negative with respect to the cathode during such half-cycle. In this respect, they are similar to gas-filled tubes. Therefore, even though switch 31 is closed, the rectifier 21 will continue to conduct until the end of the positive half-cycle. At that time conduction thereof will cease. When conduction of rectifier 21 ceases there will no longer be a potential drop across resistance 24 and charging of the capacitor 43 will cease.

The capacitor 43 will then commence to discharge through a path including the resistance 24, conductor 19, winding 13, conductor 18, rectifier 37 and resistances 38 and 39. This will apply a negative potential overcoming the positive potential from rectifier 37 on the gate of rectifier 33. Inasmuch as this is a virtually instantaneous action, the rectifier 33 will cease conducting at the same time as the rectifier 21 and it will remain nonconducting until such time as the charge on capacitor 43 has drained to such a level that the positive potential from rectifier 37 overcomes same to make the gate of rectifier 33 positive with respect to the cathode thereof.

With the rectifier 33 nonconductive, the capacitor 34 will discharge and the rectifier 53 will become conductive when the conductor 19 becomes positive due to the positive potential applied to the gate thereof by the rectifier 54. When rectifier 53 becomes conductive, energy travels through the primary winding 59 of transformer 58 and thereby energizes the secondary winding 61. A minor portion of the energy in the secondary winding is transmitted through the rectifier 70 and resistance 71 to the gate of rectifier 57 to make same positive so that it can conduct on the following half-cycle (when conductor 18 is positive). Thus, the rectifiers 53 and 57 will conduct on alternate half-cycles of the alternating potential source so long as the capacitor 34 is discharged. This will transmit full waves of energy through the primary winding 59. This, in a conventional and well understood manner, will effect energization of the primary winding 67 of the transformer 68 with the results to be described in greater detail hereinbelow. Obviously the time at which the pulses are fed through the primary winding 67 with respect to the wave form of the A.C. source may be changed by adjusting the setting of the resistance 62 of the phase-shift circuit.

Returning now to the operation of capacitor 43 and rectifier 33, at a certain time, depending upon the setting of resistance 39, the charge on capacitor 43 will drain to such a level that it will be overcome by the positive potential supplied by rectifier 37. The rectifier 33 will become conductive immediately if conductor 18 is positive at that time; or else at the beginning of the next positive half-cycle of the alternating potential source. This will effect a charging of the capacitor 34 and such, in turn, will block conduction of rectifier 53. This will in turn prevent conduction of rectifier 57 since there will be no potential to make its gate positive. Therefore, the capacitor 43 functions as a timing capacitor for closely controlling the time during which the rectifiers 53 and 57 are conductive. This timing always starts at the completion of a positive half-cycle of the source and its duration may be accurately controlled.

Turning now to the operation of the contactor circuit 17, when phase-shifted pulses are supplied to the primary winding 67 of the transformer 68, which occurs only when rectifiers 53 and 57 are conductive, the secondary windings 77 and 77a will be energized and these will supply positive potential to the gates of the rectifiers 75 and 76. The rectifiers, since they are connected in back-to-back relation, will become conductive on alternate half-cycles of the alternating potential applied to the lines 72 and 80. Thus, welding energy will be supplied to the primary winding 73. The amount and time of supplying such welding energy can be adjusted by adjustment of resistance 62 of the phase shift circuit.

The Zeners 81 and 82 will prevent any excess voltage from being imposed on the rectifiers 75 and 76, such as might occur due to transients created by collapsing of the flux in the welding transformer.

While a particular preferred embodiment of the invention has been described hereinabove, the invention contemplates such changes and modifications therein as lie within the scope of the appended claims.

What is claimed is:

1. A circuit for controlling supply of energy to a load comprising: a source of alternating potential; a pair of semiconductor, controlled rectifiers connected in parallel to said source; a biasing source associated with each of said rectifiers and connected to the gate thereof for applying a positive potential thereto when the anode thereof is positive; a capacitor connected at one side thereof in circuit with one of said rectifiers and connected at the other side to the gate of the other rectifier whereby said capacitor is charged when said rectifiers are conductive; means for placing the gate of said one rectifier at the potential of the cathode thereof whereupon said one rectifier becomes nonconductive at the beginning of the next half-cycle of said source, the charge on said capacitor thereupon rendering the other rectifier nonconductive; and means for draining the charge on said capacitor at a controlled rate so that said other rectifier becomes conductive a predetermined time after it is rendered nonconductive.

2. A circuit for controlling the supply of energy to a load comprising a source of alternating potential; a first pair of semiconductor, controlled rectifiers connected to said source; biasing means connected to the gates of said rectifiers for normally biasing same conductive; switch means for connecting the cathode of one rectifier to the gate thereof for rendering same non-conductive; a timing capacitor connected between the cathode of said one rectifier and the gate of the other rectifier for being charged by gate-to-cathode conduction in said other rectifier in response to conduction of said one rectifier, the negative terminal of said capacitor being connected to said gate of said other rectifier so that said other rectifier is rendered nonconductive when said one rectifier is nonconductive; means for discharging said capacitor at a controlled rate so that said other rectifier is rendered conductive at a predetermined time after it is made nonconductive; a second capacitor connected to said other rectifier for being charged when same is conductive; a second pair of semiconductor, controlled rectifiers connected in back-to-back relationship to said source and to the load; biasing means connected to the gate of one of said second pair of rectifiers for normally biasing same conductive, said last-named gate also being connected to the negative side of said second capacitor so that the last-named rectifier is maintained nonconductive until a predetermined time after the other of the first pair of rectifiers becomes nonconductive; the other of said second pair of rectifiers having its gate connected so as to receive positive potential from the load when said one of said second pair of rectifiers is conductive whereby said second pair of rectifiers will conduct, respectively, on opposite half-cycles so long as said one rectifier of said second pair is capable of conducting.

3. In a circuit for supplying energy to a welding machine, the combination comprising: a source of alternating potential; a pair of back-to-back connected switches connected to said source for controlling supply of energy therefrom to the welding machine; voltage breakdown means connected in parallel with said switches so that the voltage applied to said switches will be limited.

4. In a circuit for supplying energy to a welding transformer, the combination comprising: a source of alternating potential; a pair of back-to-back connected semiconductors, controlled rectifiers connected to said source for controlling supply of energy therefrom to the welding transformer; a pair of voltage reference diodes which each have a breakdown reverse-voltage characteristic, said diodes being connected in series and in opposing polarities with each other and in parallel with said rectifiers so that the voltage applied across said rectifiers is limited.

5. A circuit for supplying energy to a welding transformer, the combination comprising: a source of alternating potential; a pair of back-to-back connected semiconductor, controlled rectifiers connected to said source for controlling supply of energy therefrom to the welding transformer; means for rendering said rectifiers conductive and phase-shift means for adjusting the time with respect to wave form of the alternating potential source at which said rectifiers become conductive; a pair of Zeners, said Zeners being connected in series and in opposing polarities with each other and in parallel with said rectifiers so that the voltages applied across said rectifiers are limited.

6. A circuit for controlling the flow of energy to a welding transformer comprising a source of alternating potential; a first pair of semiconductor, controlled rectifiers connected to said source; biasing means connected to the gates of said rectifiers for normally biasing same conductive; switch means for connecting the cathode of one rectifier to the gate thereof for rendering same nonconductive; a timing capacitor connected to the gate of the other rectifier for being charged by gate-to-cathode conduction therein in response to conduction of said one rectifier, the negative terminal of said capacitor being connected to said gate of said other rectifier so that said other rectifier is rendered nonconductive when said one rectifier is rendered nonconductive; means for discharging said capacitor at a controlled rate so that said other rectifier is rendered conductive at a predetermined time after it is rendered nonconductive; a second capacitor connected to said other rectifier for being charged when same is conductive; a second pair of semiconductor, controlled rectifiers connected in back-to-back relationship to said source; biasing means connected to the gate of one of said second pair of rectifiers for normally biasing same conductive, said last-named gate also being connected to the negative side of said second capacitor so that the last-named rectifier is maintained nonconductive until a predetermined time after the other of the first pair of rectifiers becomes nonconductive; the other of said second pair of rectifiers having its gate connected so as to receive positive potential when said one of said second pair of rectifiers is conductive whereby said second pair of rectifiers will conduct respectively on opposite half-cycles so long as said one rectifier of said second pair is capable of conducting; a transformer connected in series with said second pair of rectifiers, the secondary winding of said transformer being connected through a phase-shift circuit to the primary winding of a further transformer so that phase-shifted pulses are supplied thereto when said second pair of rectifiers are conductive; a third pair of back-to-back connected semiconductor, controlled rectifiers, said further transformer having secondary windings connected between the gate and cathode of said third pair of rectifiers so that positive potential is applied on the gates thereof when pulses are supplied to said further transformer whereby said third pair of rectifiers become capable of conduction, said third pair of rectifiers being connected in back-to-back relationship to the primary winding of the welding transformer; and a pair of Zener devices connected in series and in opposing polarities with each other and in parallel with said third pair of rectifiers for limiting the voltage applied thereacross.

References Cited in the file of this patent

UNITED STATES PATENTS 2,605,448    Rockafellow          July 29, 1952
2,666,887    Rockafellow          Jan. 19, 1954

OTHER REFERENCES

"A Survey of Some Circuit Applications of Silicon Controlled Rectifier," Bulletin D420-02-8-59, Solid States Products Inc., Salem, Mass.